Figure 1:
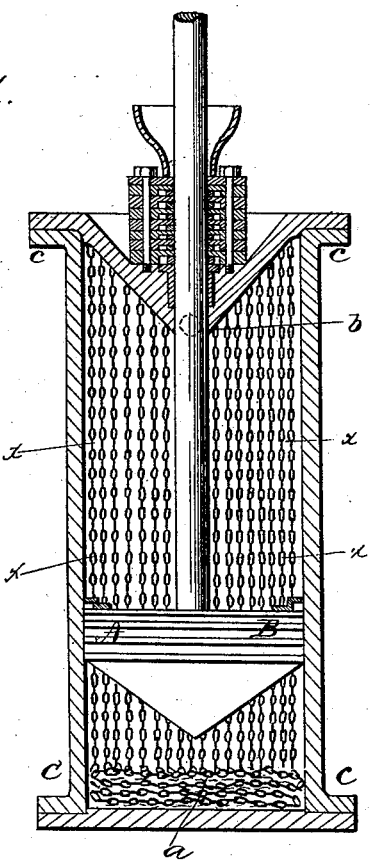

(No Model.) 2 Sheets—Sheet 1.

C. TELLIER.
MEANS FOR RAPIDLY EXTRACTING CALORIC FROM OR COMMUNICATING IT TO LIQUIDS.

No. 275,437. Patented Apr. 10, 1883.

WITNESSES
F. L. Durand
Chas. R. Abell

INVENTOR
Charles Tellier
by John J. Halsted & Son, Attorneys

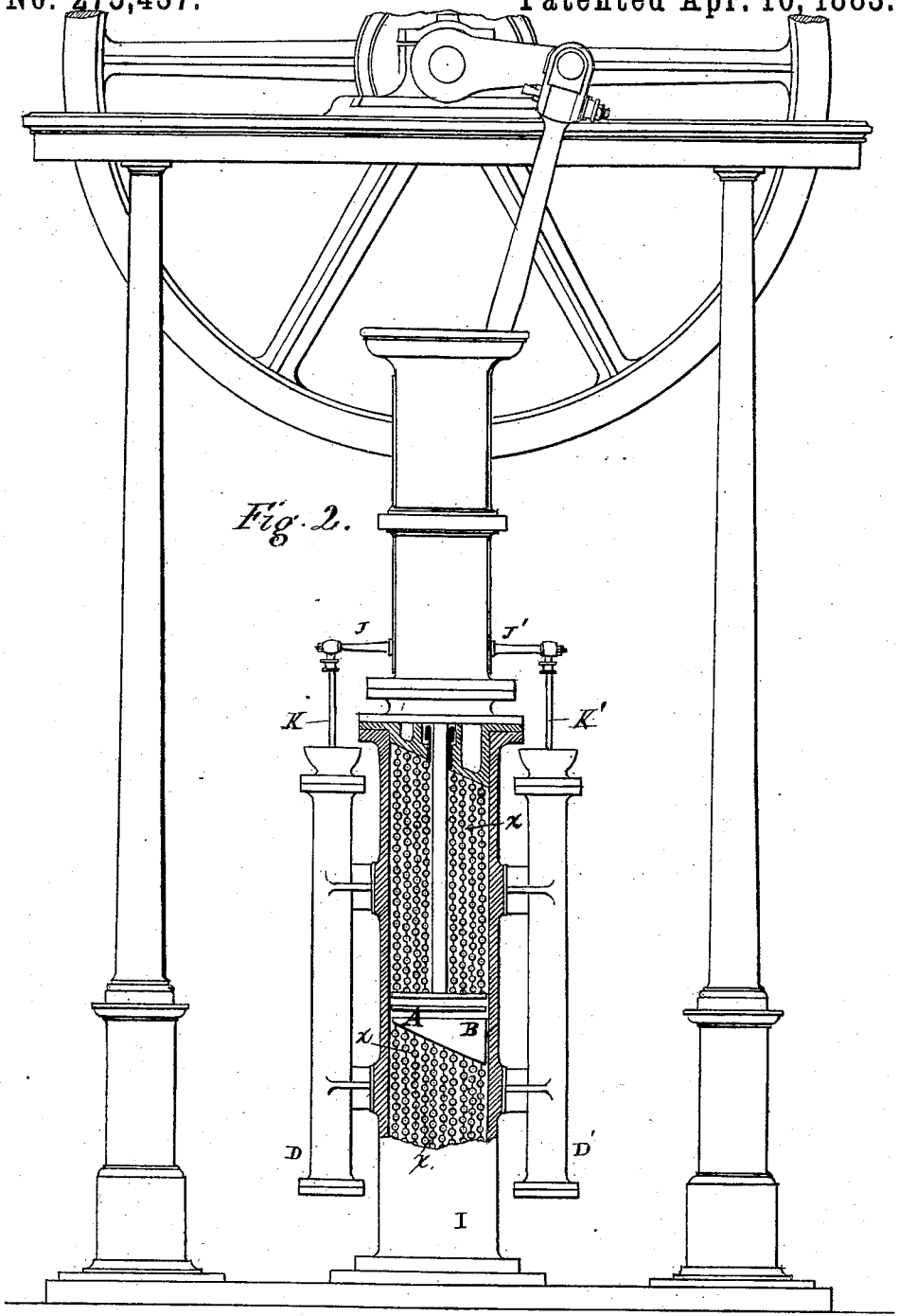

UNITED STATES PATENT OFFICE.

CHARLES TELLIER, OF PARIS, FRANCE.

MEANS FOR RAPIDLY EXTRACTING CALORIC FROM OR COMMUNICATING IT TO LIQUIDS.

SPECIFICATION forming part of Letters Patent No. 275,437, dated April 10, 1883.

Application filed October 31, 1881. (No model.)

*To all whom it may concern:*

Be it known that I, CHARLES TELLIER, a citizen of the Republic of France, residing at Paris, France, have invented new and useful Improvements in Machines or Apparatus for Rapidly Extracting Caloric from or Communicating it to Liquids or Fluids during their Utilization in Cylinders, of which the following is a specification.

This invention has for its object to rapidly extract caloric from or communicate it to liquids or fluids which are being utilized in cylinders to produce motive power or cold for compressing gases, and for other purposes. For this purpose I employ movable chains or other analogous means, such as wire-cloth or rods entering sheaths placed under the pistons or below them in such a manner as to maintain the calorific action in the cylinder or to disperse it, as required.

The general arrangement of apparatus which I employ, and which may be modified in various ways, is represented in longitudinal section in the accompanying drawings, in which—

Figure 1 shows a general arrangement, and Fig. 2 the invention applied to a motive-engine.

Referring first to Fig. 1, a cylinder, C, is provided with a piston, A B, chains $x\,x\,x\,x$ or their equivalents stretching above the cylinder-cover, as well as below the piston, down to the bottom of the cylinder. The cylinder is longer than the length of stroke of the piston. Through either the orifice $a$ or the orifice $b$, I introduce at each stroke of the piston a hot or a cold liquid, the chains suspended under the cover or under the piston-plunger into this liquid at each upward and downward stroke of the piston, so that they become of the same temperature as that of the injected liquid, so that when these chains $x\,x\,x\,x$ spread out in the interior of the cylinder they keep up from their number and construction the temperature of the injected liquid. If this liquid be hot, the expansion of the gas or vapors employed in the cylinder will take place at the temperature of the said liquid, and the heat necessary for the mechanical work will be furnished by the chains, which each time they plunge in the liquid will retake the normal temperature. The steam or gas will thus expand without loss of heat, and therefore without loss of mechanical effect. If, on the other hand, a gas has to be compressed, the chains absorb the heat from the compression, which is then disengaged in the cylinder, and the cold liquid which I then cause to circulate therein. This liquid in its turn will at each stroke take up the heat absorbed by the chains and leave them to spread themselves out in the cylinder at each stroke of the piston, ready to be again reheated. If it is required to produce cold by means of the expansion of air or of a gas in the cylinder, I cause an uncongealable solution to circulate therein at the temperature to be produced, say 10° centigrade to below zero centigrade. On the same principle the expansion will take place at this temperature, thereby leaving all its energy to the recovered mechanical action and reducing the power to be employed to a minimum.

It will be understood that this invention may be varied in its applications, and in the mode of working it, provided the principle be retained—that is to say, the forming of a kind of calorific sponge either above or below the piston, and which maintains its calorific action by means of a hot or cold current, thereby exerting an energetic action on the calorific manifestations produced in the cylinders, which have for object the utilization of fluids.

Having now explained the principle of my invention, I will describe the same by reference to Sheet 2 of accompanying drawings as applied to a motive-engine.

The apparatus consists of a cylinder, C, in which moves a piston, A B, provided at its lower part with chains $x$, the under side of the cylinder-cover being also provided with similar chains $x$. The pumps D D' alternately introduce heated oil (or other suitable liquid) to the upper and lower part of the cylinder, which oil or other liquid falls to the bottom I, and on the piston A B, so that the chains alternately plunge therein. At each stroke the pumps D D' send the oil into a boiler to be reheated. The piston-rod draws along the pieces J J', which drive the pump-rods K K'. Steam or compressed air may be employed in the cylinder as a motive-power. At each stroke of the piston the chains plunge into the hot liquid introduced into the cylinder by the pumps D D'. The chains become of equal temperature with the heated liquid, and when expansion takes place the heated chains restore to the expanded steam or gas the heat they contain, and which is thus utilized to increase the mechanical work.

What I claim as my invention is—

The combination, in a cylinder, with the movable piston, of disks or plates, chains, wire-cloths, rods, or equivalents, as described, freely held or secured to the piston, for rapidly communicating caloric or extracting it from fluids which are contained therein.

CH. TELLIER.

Witnesses:
H. DUFRENÉ,
C. FAVROT.